US012664056B2

(12) United States Patent
Borlick et al.

(10) Patent No.: US 12,664,056 B2
(45) Date of Patent: Jun. 23, 2026

(54) DYNAMIC USE OF BACKUP PLANS IN A DATA STORAGE SYSTEM

(71) Applicant: International Business Machines Corporation, Armonk, NY (US)

(72) Inventors: Matthew G. Borlick, Tucson, AZ (US); Brian Anthony Rinaldi, Tucson, AZ (US); Micah Robison, Tucson, AZ (US); Lokesh Mohan Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/648,165

(22) Filed: Apr. 26, 2024

(65) Prior Publication Data

US 2025/0335307 A1 Oct. 30, 2025

(51) Int. Cl.
| | |
|---|---|
| *G06F 12/08* | (2016.01) |
| *G06F 3/06* | (2006.01) |
| *G06F 11/1446* | (2026.01) |
| *G06F 12/0808* | (2016.01) |
| *G06F 12/0815* | (2016.01) |

(52) U.S. Cl.
CPC ........ *G06F 11/1461* (2013.01); *G06F 3/0619* (2013.01); *G06F 3/065* (2013.01); *G06F 3/0653* (2013.01); *G06F 3/0683* (2013.01)

(58) Field of Classification Search
CPC ............................ G06F 3/0613; G06F 3/0659
USPC ........................................................ 711/162
See application file for complete search history.

(56) References Cited

U.S. PATENT DOCUMENTS

| | | | | |
|---|---|---|---|---|
| 8,423,731 B1 * | 4/2013 | Nadathur | ............ | G06F 11/1461 |
| | | | | 711/111 |
| 10,235,088 B1 * | 3/2019 | Baruch | ................. | G06F 3/0619 |
| 11,669,261 B2 * | 6/2023 | Littlefield | ............. | G06F 3/0641 |
| | | | | 711/162 |
| 2010/0106933 A1 * | 4/2010 | Kamila | ................... | H04L 43/16 |
| | | | | 709/224 |
| 2010/0293147 A1 * | 11/2010 | Snow | ....................... | G06F 16/10 |
| | | | | 707/E17.007 |
| 2019/0095288 A1 * | 3/2019 | Formato | ............. | G06F 11/1464 |

(Continued)

OTHER PUBLICATIONS

Frankenberg et al., "IBM Storage DS8000 Safeguarded Copy Updated for DS8000 Release 9.3.2," IBM Redbooks, Jun. 2023, 250 pages.

(Continued)

*Primary Examiner* — Mohamed M Gebril
(74) *Attorney, Agent, or Firm* — Daniel M. Yeates

(57) ABSTRACT

A computer-implemented method, according to one embodiment, includes determining and using a first backup plan, where the first backup plan details a first number of backup copies of source volumes that are to be created and a first time interval that the first number of backup copies are to be created. In response to a determination that a first set of conditions are met during use of the first backup plan in a data storage system, a second backup plan that details a second number of backup copies of the source volumes that are to be created and a second time interval that the second number of backup copies are to be created are determined and used. In response to a determination that a second set of conditions are met during use of the second backup plan, a reversion to use of the first backup plan is caused.

17 Claims, 2 Drawing Sheets

(56) References Cited

U.S. PATENT DOCUMENTS

| | | | | |
|---|---|---|---|---|
| 2022/0043573 | A1 | 2/2022 | Sanchez et al. | |
| 2022/0043583 | A1 | 2/2022 | Francisco et al. | |
| 2022/0100611 | A1* | 3/2022 | Aseev | G06F 16/122 |
| 2022/0171680 | A1* | 6/2022 | Barbalho | G06F 11/1451 |
| 2022/0283908 | A1* | 9/2022 | Rath | G06F 3/0634 |
| 2022/0342769 | A1* | 10/2022 | Brenner | H04L 41/0816 |
| 2024/0330114 | A1* | 10/2024 | Akiba | G06F 11/1448 |

OTHER PUBLICATIONS

Greenfield et al., "IBM FlashSystem Safeguarded Copy Implementation Guide," IBM Redbooks, Mar. 2022, 62 pages.

* cited by examiner

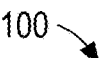
100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

BACKUP PLAN DETERMINATION CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

DYNAMIC USE OF BACKUP PLANS IN A DATA STORAGE SYSTEM

BACKGROUND

The present invention relates to data storage systems, and more specifically, this invention relates to data backup in data storage systems.

Data storage systems sometimes store more than one copy of data that may be relied on in one or more situations. For example, a first copy of data may be stored at a first data site of the data storage system, while a second copy of data may be stored at a second data site of the data storage system. These copies of data may be ongoingly updated and relied on in the event that a predetermined type of situation occurs, e.g., a disaster event occurs at one of the sites, one of the copies of data are inadvertently deleted, one of the copies of data is compromised during a malicious attack event, etc.

SUMMARY

A computer-implemented method, according to one embodiment, includes determining and using a first backup plan, where the first backup plan details a first number of backup copies of source volumes that are to be created and a first time interval that the first number of backup copies are to be created. In response to a determination that a first set of predetermined conditions are met during use of the first backup plan in a data storage system that includes the source volumes, a second backup plan that details a second number of backup copies of the source volumes that are to be created and a second time interval that the second number of backup copies are to be created are determined and used. In response to a determination that a second set of predetermined conditions are met during use of the second backup plan in the data storage system, a reversion to use of the first backup plan in the data storage system is caused.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2:
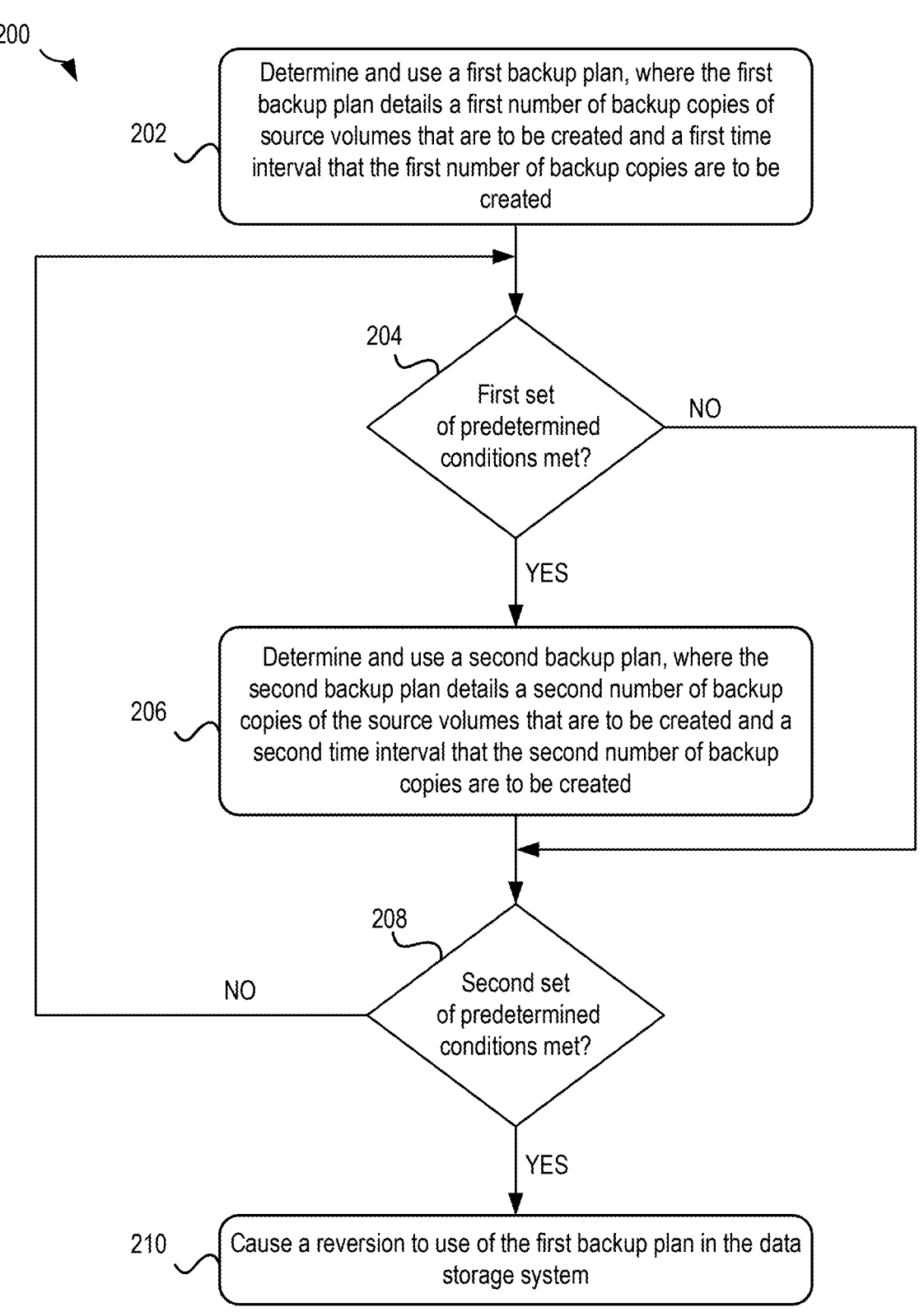
FIG. 2 is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic use of backup plans in a data storage system.

In one general embodiment, a computer-implemented method includes determining and using a first backup plan, where the first backup plan details a first number of backup copies of source volumes that are to be created and a first time interval that the first number of backup copies are to be created. In response to a determination that a first set of predetermined conditions are met during use of the first backup plan in a data storage system that includes the source volumes, a second backup plan that details a second number of backup copies of the source volumes that are to be created and a second time interval that the second number of backup copies are to be created are determined and used. In response to a determination that a second set of predetermined conditions are met during use of the second backup plan in the data storage system, a reversion to use of the first backup plan in the data storage system is caused.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as backup plan determination code of block 150 for dynamic use of backup plans in a data storage system. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, data storage systems sometimes store more than one copy of data that may be relied on in one or more situations. For example, a first copy of data may be stored at a first data site of the data storage system, while a second copy of data may be stored at a second data site of the data storage system. These copies of data may be ongoingly updated and relied on in the event that a predetermined type of situation occurs, e.g., a disaster event occurs at one of the sites, one of the copies of data are inadvertently deleted, one of the copies of data is compromised during a malicious attack event, etc.

In some data storage systems, clients are able to specify (in service level agreements (SLAs)) a number of copies of a source volume of data that are to be stored. For example, a customer may specify that six backup copies of a source volume of data be backed up. However, there are several drawbacks with fixed SLAs. For example, a data storage system may be unable to achieve the requirements of an SLA. For example, there may be periods of time during operation of a data storage system in which, in an attempt to fulfill the requirements of an SLA, an extent pool and/or storage controller run out of free space. This results in a failure to fulfill the SLA, and moreover, the introduction of latency in the data storage system as write operations wait for resources to become available. Another drawback includes customers only using backup copies on selected volumes based on a realization that the data storage system does not include enough space during periods of peak write activity.

In sharp contrast to the deficiencies described above, the techniques of embodiments and approaches described herein enable dynamic SLAs as opposed to fixed SLAs. More specifically, conditions of a data storage system are monitored, and based on the conditions that are observed, a dynamic backup scheme (that includes two or more backup plans) is deployed. The dynamic nature of the backup plan that is used at a given time enables a relatively refined performance within the data storage system because backup operations of an SLA that would otherwise result in latency and/or failures within the data storage system are avoided.

Now referring to FIG. 2, a flowchart of a method 200 is shown according to one embodiment. The method 200 may be performed in accordance with the present invention in any of the environments depicted in FIGS. 1-2, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a storage controller, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Method 200 may be performed in a type of data storage environment that would become apparent to one of ordinary skill in the art after reading the descriptions herein. In some approaches, the data storage environment includes a data storage system in which source volumes of data, and potentially one or more backup copies of the source volumes of data, are selectively stored for at least one client. It may be prefaced that, in some illustrative approaches, the backup copies of the source volumes are safeguarded copies that are maintained in IBM's DS8000 series storage media platform. In one or more of such approaches, the DS8K may offer service level agreements for safeguarded copies of volumes of data. In some other approaches, the backup copies may additionally and/or alternatively be copies of a source volume in a mirrored distributed storage cloud, e.g., with a plurality of replication sites.

Method 200, in some preferred approaches, is a method of dynamic backup schedules (including a number of backups and a time interval in which the backups are created) in a data storage system.

Operation 202 includes determining and using a first backup plan. The first backup plan, in some approaches, details a first number of backup copies of source volumes that are to be created and a first time interval that the first number of backup copies are to be created.

Determination of the first backup plan may, in some approaches, be based on an evaluation of an SLA of a customer that has data stored on the source volumes in the data storage system. Accordingly, in one or more of such approaches, determining the first backup plan may include auditing a preexisting SLA to determine the first number of backup copies of source volumes that are to be created and/or the first time interval that the first number of backup copies are to be created. In some approaches, this auditing may be caused to be performed by instructing a predetermined artificial intelligence (AI) engine to perform natural language processing (NLP) on the preexisting SLA to identify one or more predetermined types of keywords, e.g., "create", "every", "hour", "minute", "backup", etc.

For context, in some approaches, within the preexisting SLA a customer may specify a minimum and a maximum number of backups, and/or a minimum and maximum time interval in which the backups are generated and stored in the data storage system, e.g., safeguarded copies of the source volumes, mirrored copies of the source volumes, failover copies of the source volumes, etc. Examples of these specifications of illustrative SLAs include: create four to eight backups every four hours, create four backups every two to four hours, and create four to eight backups every two to four hours.

In another approach, examples of specifications of illustrative SLAs may be based on a customer setting up a number of background copies and time interval for a consistency group as follows: a number of backups being from five to ten with a default being ten backups, and the number of backups being performed in a time interval in a range of two hours to four hours (with a default of four hours. An expected change rate may, in some approaches, additionally and/or alternatively be specified in the illustration SLA. For context, the expected change rate may be a rate and/or numerical value that represents a change in the number of writes to a source volume within a predetermined time interval. For example, an expected change rate of 25% of source capacity may indicate that a current number of writes to a source volume may increase or decrease by 25% within the predetermined time interval. It should be noted that the numbers and rates detailed in the examples above may, in some approaches, be provided by a customer based on a space available for dynamic SLA copies, be provided and identified in guidelines of an SLA provided by a customer, etc. In other words, these values may be different in other approaches, and/or than values otherwise used for fixed SLAs.

In some approaches, the first backup plan is, at least initially, used in the data storage system for fulfilling an SLA for a customer. However, in some preferred approaches, because conditions within the data storage system may change at any time, method 200 preferably includes ongoingly monitoring one or more conditions within the data storage system to determine whether to continue to use a backup plan, or to change to a different backup plan. As will be described in greater detail elsewhere herein, as a result of changing between backup plans based on conditions within the data storage system, an extent pool and/or storage controller of the data system do not run out of free space, e.g., unsustainable backup plans are identified and a different sustainable backup plan is used in order to mitigate latency in the data storage system. Various techniques of approaches below detail, in some approaches, how to perform the monitoring of conditions mentioned above.

In some approaches, monitoring performed in the data storage system includes determining predetermined variable(s) such as a true change rate and/or a total change rate for the source volumes, e.g., which may be a set of volumes in a dynamic SLA safeguarded consistency group. The determination of variables, e.g., true change rate, total change rate, etc., may be used to determine whether predetermined conditions are met. Furthermore, in some approaches, these variables may be evaluated and/or calculated with respect to consistency periods, e.g., where each consistency period may be a predetermined sampling period that is a predetermined period of time. These sampling periods may be periods of time during the monitoring described herein, and in some approaches, the predetermined sampling period matches the time interval of a backup plan. A new consistency period may be determined to begin, and method 200 may include tracking a count of new writes in non-volatile storage (NVS) volumes, and a total number of writes for these volumes. The determination of variables, e.g., true change rate, total change rate, etc., may be used to determine whether predetermined conditions are met.

The true change rate variable (with respect to a given one of the sampling periods) mentioned above is preferably equal to a number of new writes performed on the source volumes during the sampling period divided by the time of the sampling period (see Equation 1 below). It should be noted that the true change rate with respect to the sampling period does not include write operations that may otherwise be considered in the total change rate. For example, the true change rate with respect to the sampling period preferably does not include write operations performed for replicating data written during performance of the new writes on the source volumes (does not include data replication write operations such as where multiple backup copies of the source volumes are written, but does include the first instance of the source volume being written in the replication sequence based on the first instance being a new write operation at that point). Meanwhile, the total change rate is a total number of writes that are performed on the source volumes divided by the time of the sampling period (see Equation 2 below).

$$\text{TRUE CHANGE RATE} = \text{Number of new writes/Time} \quad \text{Equation (1)}$$

$$\text{TOTAL CHANGE RATE} = \text{Total number of writes/Time} \quad \text{Equation (2)}$$

In some approaches, the first backup plan is based on a customer configured number of backups and time interval of backups. This way, an initially applied backup plan satisfies customer specifications. Thereafter, as time goes on, backup copies of the source volumes may be caused to take up an expected amount of space based on an expected change rate and number of backups. For context, in some approaches, the expected amount of space may be specified by a customer. In some other approaches, the expected amount of space may be determined by obtaining past performance data of the data storage system, e.g., from a historical log that the data storage system maintains. The obtained past performance data of the data storage system may then, in some approaches, be used to estimate the expected change rate. For example, in some approaches, determining the first backup plan includes causing an artificial intelligence (AI) engine to estimate the expected change rate based on an evaluation of the past performance data. This estimation may include forecasting the expected change rate based on the AI engine identifying a previous performance period of the data storage system that matches a most recent performance period of the data storage system. The expected space taken by backup copies of the source volume may be determined using Equation (3) below. Note that the time interval for a backup may, in some approaches, be the time of a predetermined sampling period.

$$\text{Excepted space taken by backup copies} = \qquad \text{Equation (3)}$$
$$\text{Expected change rate} * \text{Time interval}$$
$$\text{for a backup} * \text{Number of backup copies}$$

In some approaches, monitoring performed in the data storage system (in order to determine whether to transition from a currently used backup plan) includes using the variables in determinations of whether one or more predetermined conditions are met. For example, in some approaches, a determination is made as to whether a first set of predetermined conditions are met, e.g., see decision 204. At least some conditions of the first set of predetermined conditions preferably are performance-based conditions. For example, in some illustrative approaches, the first set of predetermined conditions are based on a size of available free space in storage of the data storage system for the first number of backup copies. More specifically, in some illustrative approaches, one or more of the predetermined conditions are based on an amount of free space (of the data storage system) available for storing backup copies of the source volumes copies being less than or equal to a predetermined threshold, e.g., such as 20% of a total size of a total storage space. Such a predetermined condition being based on the available amount of free space may be used as a buffer that ensures that there is time to switch to a different backup plan in the event that a current backup plan has an unsustainable write rate, e.g., the available free space will be entirely filled based on the unsustainable write rate. In other words, in response to a determination that the condition is met, the current backup plan may be determined to have an unsustainable write rate.

In some other approaches, one or more of the predetermined conditions may additionally and/or alternatively be based on an observed true change rate of write operations performed on the source volumes during a predetermined number of previous sampling periods, e.g., consecutive including a last and most recent sampling period. More specifically, in some illustrative approaches, one or more of the predetermined conditions are based on the true change rate for the source volumes in the last few sampling periods, e.g., such as four of the last sampling periods, exceeding an expected change rate by at least a predetermined threshold, e.g., at least 50%. For context, the true change rate for the source volumes in the last few sampling periods exceeding the expected change rate by at least the predetermined threshold may be indicative of write operations being performed on the free space at a rate that is greater than what was anticipated at a time at which the current backup policy was determined and implemented. Accordingly, use of this condition in a determination of whether or not to change the backup plan that is currently applied ensures that unexpected true change rates do not cause an event in which free space becomes unavailable in the data storage system.

In some other approaches, one or more of the predetermined conditions may additionally and/or alternatively be based on whether actual space taken by the first number of backup copies exceeds an expected space of the first number of backup copies by more than a predetermined amount (e.g. being much larger than). In some approaches, the predetermined amount is based on a predetermined ratio. For example, the predetermined condition may be defined as actual space taken by the first number of backup copies being larger than a predetermined threshold amount of the expected space taken by the first number of backup copies by a threshold, e.g., at least 50%.

In some preferred approaches, the first set of predetermined conditions are based on based on: a size of available free space in storage of the data storage system for the first number of backup copies, an observed true change rate of write operations performed on the source volumes during a predetermined number of previous sampling periods, and whether actual space taken by the first number of backup copies exceeds an expected space of the first number of backup copies by more than a predetermined amount.

In response to a determination that the first set of predetermined conditions are met during use of the first backup plan in a data storage system that includes the source volumes, e.g., as illustrated by the "Yes" logical path of decision 204, method 200 includes determining and using a second backup plan, e.g., see operation 206. The second backup plan details a second number of backup copies of the source volumes that are to be created and a second time interval that the second number of backup copies are to be created. The second number of backup copies and/or the second time interval is different than the first number of backup copies and/or the first time interval, e.g., in order to mitigate a backup plan that is identified, based on the conditions, to be unsustainable. In contrast, in response to a determination that the first set of predetermined conditions are not met during use of the first backup plan in the data storage system that includes the source volumes, e.g., as illustrated by the "No" logical path of decision 204, method 200 optionally continues to decision 208. Furthermore, in response to the determination that the first set of predetermined conditions are not met during use of the first backup plan in the data storage system that includes the source volumes, use of the first backup plan may be determined to be, at least at the time of the determination, sustainable. Accordingly, use of the first backup plan may continue at least until a determination is made to the contrary.

Monitoring to determine whether the currently used backup plan is sustainable and enables efficiencies in the operation of the data storage preferably continues. For example, a determination may be made as to whether a second set of predetermined conditions are met, e.g., see decision 208. It should be noted that, in some approaches, decision 208 may be based on whether a third backup plan should be used, while in some other approaches, decision 208 may be performed in order to determine whether to revert back to use of the first backup plan. The second set of predetermined conditions may, in some approaches, be based on the size of available free space in storage of the data storage system for the second number of backup copies. In some approaches in order to determine whether to revert back to use of the first backup plan, a first of the predetermined conditions may specify that enough free space be available for the backup copies, e.g., a sufficient amount of free space with respect to the size and/or time interval of the first backup plan is determined to be available in the data storage system. For example, such a determination may be made based on a determination that free space available in the data storage system goes above a predetermined threshold, e.g., 20%. The second set of predetermined conditions may, in some approaches, additionally and/or alternatively be based on whether the observed true change rate of the write operations (e.g., write operations performed on the source volumes during a predetermined number of previous consecutive sampling periods including the last most recent sampling period) returns to an expected change rate of the write operations. For example, the condition may specify that the true change rate for source volumes in the last predetermined number of intervals, e.g., such as four, is back to within a predetermined degree of the expected change rate, e.g., +/−5%. The second set of predetermined conditions may, in some approaches, additionally and/or alternatively be based on whether the actual space is within a predetermined range of closeness to the expected space. For example, the condition may specify that the actual space taken by backup copies is less than or within a predetermined amount from to the expected space taken by the backup copies, e.g., such as less than the expected space taken*1.05). This way a buffer is ensured to be created before any reversion back to the first backup plan.

In one preferred approach, the determination of whether to revert back to the customer configured number of backups and time interval of backups is based on each of the conditions of the second set of conditions being met, where the second set of conditions are based on: the size of available free space in storage of the data storage system for the second number of backup copies, whether the observed true change rate of the write operations returns to the expected change rate of the write operations, and whether the actual space is within a predetermined range of closeness to the expected space.

In response to a determination that the second set of predetermined conditions are not met, method 200 optionally includes continuing to use the second backup plan and continuing monitoring, e.g., see the "NO" logical path of decision 208 return to decision 204. In contrast, in response to a determination that a second set of predetermined conditions are met during use of the second backup plan in the data storage system, e.g., as illustrated by the "YES" logical path of decision 208, method 200 includes causing a reversion to use of the first backup plan in the data storage system, e.g., see operation 210. For context, in some preferred approaches, the reversion is caused to occur by using the first backup plan and stopping use of the second backup plan.

In some approaches, there may be a situation in which a determination is made that conditions do not justify a reversion to the first backup plan, and the currently used second backup plan may be determined to be unsustainable. Accordingly, approaches described below detail, in some approaches, how to determine a new backup plan that includes a new number of backup copies and time interval that the backup copies are to be created. Various approaches below detail techniques for determining a new backup plan, e.g., a new number of backup copies and a new time interval that the new number of backup copies are to be completed in.

In some approaches, Equation (4) below may be used to compute a new time delta (a new interval in which backup copies are to be created) that can be saved for backups. For context, in Equation (4), the overprovisioning variable is a predetermined amount of buffer space (available free space in the data storage system) that is to be maintained, e.g., such as 20% of total storage in the data storage system.

$$New\ total\ time\ delta = \qquad\qquad\qquad Equation\ (4)$$
$$(Total\ space\ available\ for\ safeguarded\ copies -$$
$$overprovisioning)/True\ change\ rate$$

In some approaches in which a dynamic SLA is determined to specify that the number of backup copies is to be changed by a provided range, then a new number of backup copies may be computed using Equation (5) below. Furthermore, a new time interval within which the new number of backup copies are to be generated and saved may be determined using Equation (6) below.

$$New\ number\ of\ backup\ copies = \qquad\qquad Equation\ (5)$$
$$(Original\ number\ of\ Backup\ copies * New\ total\ time\ delta)/$$
$$Original\ total\ time\ delta$$
$$New\ time\ interval\ for\ backup\ copies = \qquad\qquad Equation\ (6)$$
$$New\ Time\ Delta/Number\ of\ backup\ copies$$

In some approaches in which a dynamic SLA specifies a preference to retain the same number of copies but specifies a range of intervals, a time interval for backup copies may be computed using Equation (7) (same as above).

$$New\ time\ interval\ for\ backup\ copies = \qquad\qquad Equation\ (7)$$
$$New\ Time\ Delta/Number\ of\ original\ backup\ copies$$

In some approaches in which a dynamic SLA specifies that both the number of backup copies and the time interval can be changed, then both the number of backup copies and the time interval may be changed, or alternatively, the number of backup copies may be changed first and then the time interval may be changed if still needed, e.g., in response to a determination that the backup plan is still unsustainable after the first change. This conditional second change allows the backup plan to remain in a sustainable range (and/or a range specified in the SLA) in some approaches. In some other approaches, the time interval may first be changed and then the number of backup copies may be changed if still needed to remain in a range specified by the SLA.

Some optional operations of method 200 include informing customers of performance to expect from the data storage system during use of different backup plans. For example, in some approaches, customers may be alerted, e.g., via an alert to a customer device, that a currently used backup plan is unsustainable in the event that a determination is made that currently used backup plan is unsustainable. For example, method 200 may include determining (during the monitoring) whether the observed true change rate is larger than a predetermined threshold rate that is able to be accommodated by available free space in the storage of the data storage system. In some approaches, in response to a determination that the observed true change rate is larger than the predetermined threshold rate, an alert is issued to a customer device associated with write operations. The alert, in some approaches, preferably indicates that the true change rate is an abnormal change rate. Furthermore, the alert may additionally and/or alternatively specify which of the source volumes are associated with the abnormal change rate, e.g., in approaches in which a set of particular volumes associated with the abnormal change can be identified, and/or host activity associated with the abnormal change rate, e.g., in approaches in which no set of particular volumes can be identified.

Several performance benefits are enabled as a result of using the dynamically applied backup plans described herein rather than merely adhering to a fixed SLA. For example, a relatively reduced cost is enabled for the customer. This benefit is enabled because customers do not have to configure as much space capacity as would otherwise be required for a fixed SLA. This reduces seek times and latency when thereafter using the backup copies, e.g., shorter seeks, less index processed, etc. Accordingly, the techniques described herein enable a dynamic SLA that can be created by calculating space capacity for normal times and during peak workloads. Techniques described herein enable application of the dynamic SLA by performing monitoring and adjustments of the number of backup copies and/or time interval that the backup copies are created.

Another performance benefit enabled as a result of using the dynamically applied backup plans described herein includes relatively higher adoption of backup copies. For context, currently, customers are relatively less inclined to use backup copies for less critical volumes due to the high cost associated with the space needed with fixed SLAs during peak activity. However, the dynamic SLAs enabled herein are enabled for a fraction of the cost of the fixed SLA. In some approaches, the method 200 differentiates and enables customers to still use fixed SLA for relatively highly critical data and use the dynamic SLA for relatively less critical data. This further contributes to the adoption of backup copies.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

determining and using a first backup plan, wherein the first backup plan details a first number of backup copies of source volumes that are to be created and a first time interval that the first number of backup copies are to be created;

in response to a determination that a first set of predetermined conditions are met during use of the first backup plan in a data storage system that includes the source volumes, determining and using a second backup plan that details a second number of backup copies of the source volumes that are to be created and a second time interval that the second number of backup copies are to be created, wherein a first condition of the first set of predetermined conditions is based on a size of available free space in storage of the data storage system for the first number of backup copies and an observed change rate of write operations performed on the source volumes during a predetermined number of previous sampling periods; and in response to a determination that a second set of predetermined conditions are met during use of the second backup plan in the data storage system, causing a reversion to use of the first backup plan in the data storage system.

2. The CIM of claim 1, wherein the first set of predetermined conditions are further based on: whether space taken by the first number of backup copies exceeds an expected space of the first number of backup copies by more than a predetermined amount, wherein the second set of predetermined conditions are based on: the size of available free space in storage of the data storage system for the second number of backup copies, whether the observed change rate of the write operations returns to an expected change rate of the write operations, and whether the space taken by the first number of backup copies is within a predetermined range of closeness to the expected space.

3. The CIM of claim 2, wherein the expected space of the first number of backup copies is equal to a product of: the expected change rate, time of a given one of the previous sampling periods, and the first number of backup copies.

4. The CIM of claim 3, wherein the observed change rate with respect to the previous sampling period is equal to a number of new writes performed on the source volumes during the previous sampling period divided by the time of the previous sampling period, wherein the observed change rate with respect to the previous sampling period does not include write operations performed for replicating data written during performance of the new writes on the source volumes.

5. The CIM of claim 4, comprising: in response to a determination that the observed change rate is larger than a predetermined threshold rate, issuing an alert to a customer device that the observed change rate is an abnormal change rate, wherein the alert specifies which of the source volumes are associated with the abnormal change rate and/or host activity associated with the abnormal change rate.

6. The CIM of claim 3, comprising: obtaining past performance data of the data storage system, wherein determining the first backup plan includes causing an artificial intelligence (AI) engine to estimate the expected change rate based on an evaluation of the past performance data.

7. The CIM of claim 1, wherein determining the first backup plan includes auditing a service level agreement to determine the first number of backup copies and the first time interval.

8. A computer program product (CPP), the CPP comprising:

a set of one or more non-transitory computer-readable storage media; and program instructions, collectively stored in the set of one or more non-transitory computer-readable storage media, for causing a processor set to perform the following computer operations:

determine and use a first backup plan, wherein the first backup plan details a first number of backup copies of source volumes that are to be created and a first time interval that the first number of backup copies are to be created;

in response to a determination that a first set of predetermined conditions are met during use of the first backup plan in a data storage system that includes the source volumes, determine and use a second backup plan that details a second number of backup copies of the source volumes that are to be created and a second time interval that the second number of backup copies are to be created, wherein a first condition of the first set of predetermined conditions is based on a size of available free space in storage of the data storage system for the first number of backup copies and an observed change rate of write operations performed on the source volumes during a predetermined number of previous sampling periods; and in response to a determination that a second set of predetermined conditions are met during use of the second backup plan in the data storage system, cause a reversion to use of the first backup plan in the data storage system.

9. The CPP of claim 8, wherein the first set of predetermined conditions are further based on: whether space taken by the first number of backup copies exceeds an expected space of the first number of backup copies by more than a predetermined amount, wherein the second set of predetermined conditions are based on: the size of available free space in storage of the data storage system for the second number of backup copies, whether the observed change rate of the write operations returns to an expected change rate of the write operations, and whether the space taken by the first number of backup copies is within a predetermined range of closeness to the expected space.

10. The CPP of claim 9, wherein the expected space of the first number of backup copies is equal to a product of: the expected change rate, time of a given one of the previous sampling periods, and the first number of backup copies.

11. The CPP of claim 10, wherein the observed change rate with respect to the previous sampling period is equal to a number of new writes performed on the source volumes during the previous sampling period divided by the time of the previous sampling period, wherein the observed change rate with respect to the previous sampling period does not include write operations performed for replicating data written during performance of the new writes on the source volumes.

12. The CPP of claim 11, the CPP comprising: program instructions, collectively stored in the set of one or more non-transitory computer-readable storage media, for causing the processor set to perform the following computer operations: in response to a determination that the observed change rate is larger than a predetermined threshold rate, issue an alert to a customer device that the observed change rate is an abnormal change rate, wherein the alert specifies which of the source volumes are associated with the abnormal change rate and/or host activity associated with the abnormal change rate.

13. The CPP of claim 10, the CPP comprising: program instructions, collectively stored in the set of one or more non-transitory computer-readable storage media, for causing the processor set to perform the following computer operations: obtain past performance data of the data storage system, wherein determining the first backup plan includes causing an artificial intelligence (AI) engine to estimate the expected change rate based on an evaluation of the past performance data.

14. The CPP of claim 8, wherein determining the first backup plan includes auditing a service level agreement to determine the first number of backup copies and the first time interval.

15. A computer system (CS), the CS comprising:

a processor set;

a set of one or more computer-readable storage media; and program instructions, collectively stored in the set of one or more storage media, for causing the processor set to perform the following computer operations:

determine and use a first backup plan, wherein the first backup plan details a first number of backup copies of source volumes that are to be created and a first time interval that the first number of backup copies are to be created;

in response to a determination that a first set of predetermined conditions are met during use of the first backup plan in a data storage system that includes the source volumes, determine and use a second backup plan that details a second number of backup copies of the source volumes that are to be created and a second time interval that the second number of backup copies are to be created, wherein a first condition of the first set of predetermined conditions is based on a size of available free space in storage of the data storage system for the first number of backup copies and an observed change rate of write operations performed on the source volumes during a predetermined number of previous sampling periods; and in response to a determination that a second set of predetermined conditions are met during use of the second backup plan in the data storage system, cause a reversion to use of the first backup plan in the data storage system.

16. The CS of claim 15, wherein the first set of predetermined conditions are further based on: whether space taken by the first number of backup copies exceeds an expected space of the first number of backup copies by more than a predetermined amount, wherein the second set of predetermined conditions are based on: the size of available free space in storage of the data storage system for the second number of backup copies, whether the observed change rate of the write operations returns to an expected change rate of the write operations, and whether the space taken by the first number of backup copies is within a predetermined range of closeness to the expected space.

17. The CS of claim 15, wherein determining the first backup plan includes auditing a service level agreement to determine the first number of backup copies and the first time interval.

* * * * *